No. 732,294. Patented June 30, 1903.

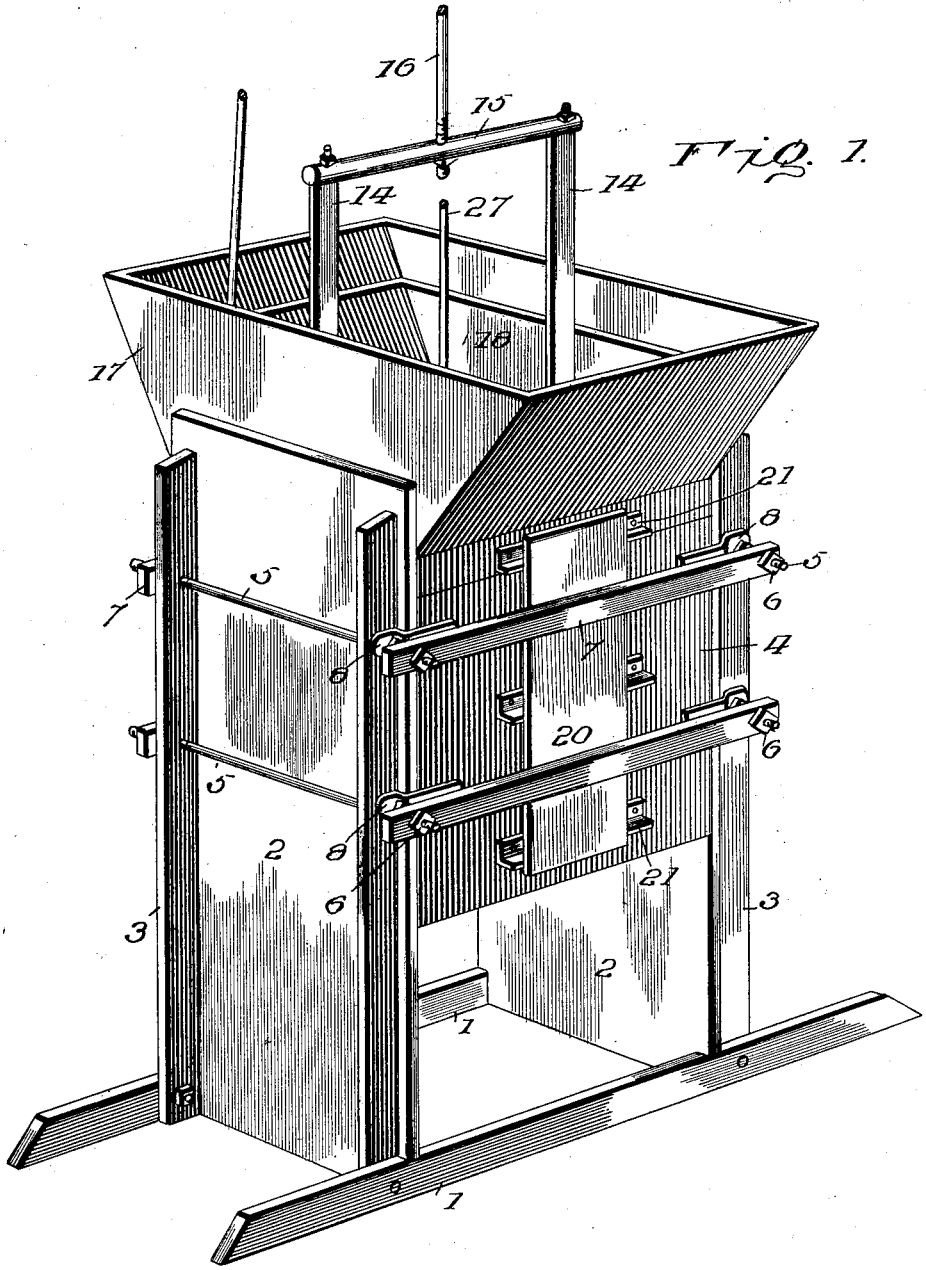

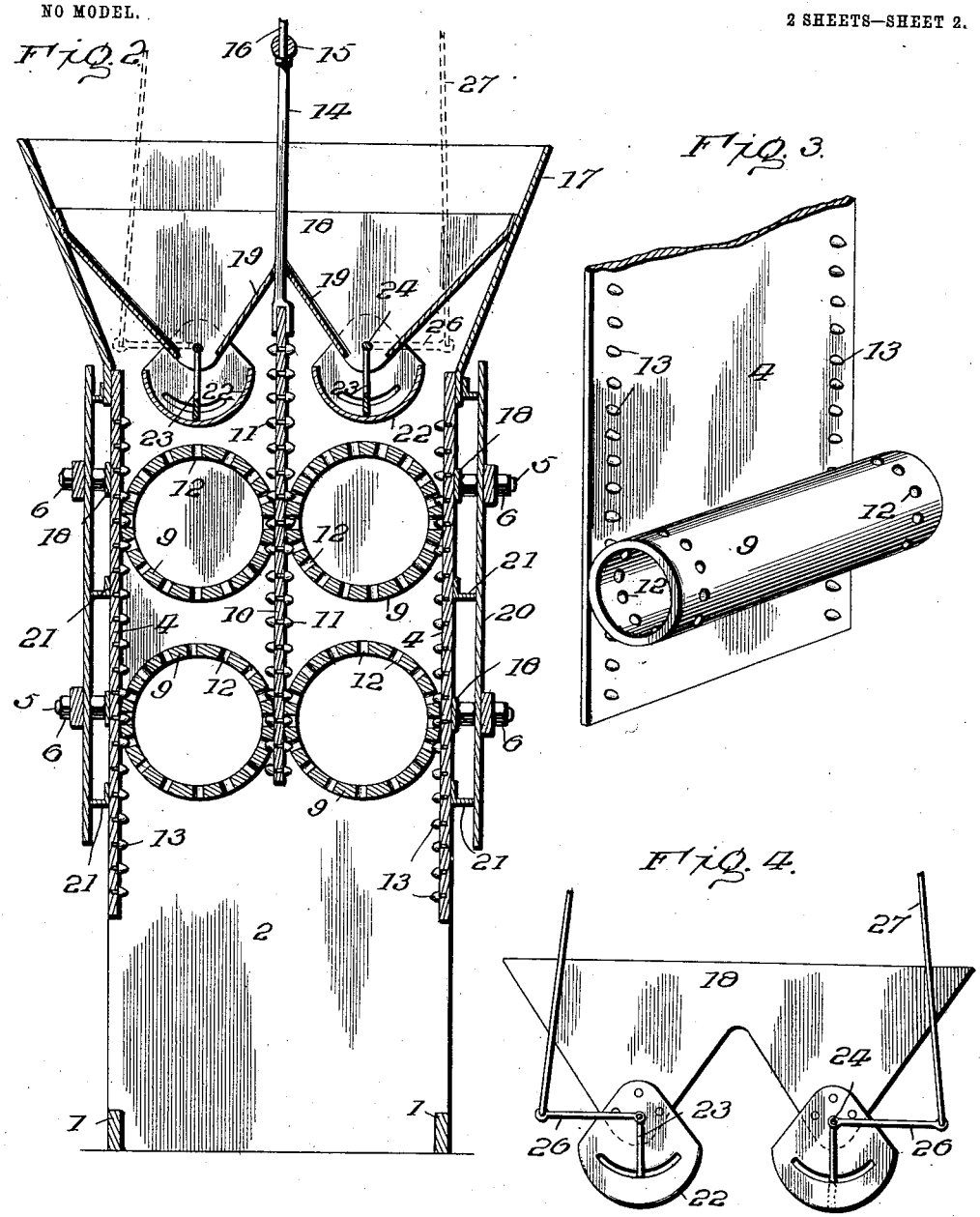

UNITED STATES PATENT OFFICE.

HIRAM C. GROVES, OF WOODWARD, OKLAHOMA TERRITORY.

MILL.

SPECIFICATION forming part of Letters Patent No. 732,294, dated June 30, 1903.

Application filed May 2, 1902. Serial No. 105,698. (No model.)

*To all whom it may concern:*

Be it known that I, HIRAM C. GROVES, a citizen of the United States, residing at Woodward, in the county of Woodward and Territory of Oklahoma, have invented certain new and useful Improvements in Mills; and I do hereby declare the following to be a full, clear, and exact description of the invention, such as will enable others skilled in the art to which it appertains to make and use the same.

My invention relates to mill construction; and it consists of certain novel features of combination and construction of parts, the preferred form whereof will be hereinafter specifically set forth, and illustrated in the accompanying drawings.

The prime object of my invention is to provide a mill of simple though reliably efficient character the parts of which may be very cheaply and expeditiously manufactured and readily assembled in their respective operative positions by any one, even though they be not skilled in the art.

A further object of my invention is to provide a grinding mechanism whereby the reciprocatory motion of the windmill or similar power may be readily utilized.

Other objects and advantages will be made apparent in the detailed specification hereinafter made which will be considered in connection with the accompanying drawings, in which—

Figure 1 is a perspective view of one form of my invention as applied to use. Fig. 2 is a vertical central section of Fig. 1. Fig. 3 is a perspective detail view of one of the grinding-rollers and a plate designed to coöperate therewith. Fig. 4 is a detail view showing an end elevation of the hopper proper and also showing the preferred means of agitating the contents of the hopper and delivering any desired quantity thereof to the grinding-rollers.

The details of my invention and the coöperating accessories deemed necessary to fully illustrate a practical application of my idea to use will for convenience be designated by numerals, the same numeral referring to a corresponding part throughout the several views.

In materializing my invention I provide any suitable form of base-section—as, for instance, the rails or supporting-beams 1, to which are attached the end sections 2, said end sections being properly connected to or integrally formed with the standards 3. Coöperating with the end sections 2, as above described, are the side walls 4, and these parts are held in operative relation to each other by the bolts or rods 5, said bolt being provided at one or both ends with the locking-nuts 6, or if preferred said rods may be provided upon one end with a suitable head and a nut upon the other, the ends of said bolts 5 being extended through suitable apertures provided in the clamping-bars 7. The clamping-bars 7 are attached in any preferred way to the compensating brackets 8, which are bent at their outer ends so as to fit snugly against the standards 3, the remainder of the brackets being disposed directly in contact with the bars 7. Within the housing or frame thus or otherwise constructed I mount the parts comprising my improved mill proper, which consist of a plurality of rollers 9, preferably four in number, each being of any desired material and designed to coöperate on their peripheral faces with the inner faces of the side walls or sections 4, and in order that said grinding-rollers may be properly actuated and sustained in their positions I provide a middle plate 10, carrying upon each edge a plurality of teeth 11, said teeth being upon both sides of the plate and designed to engage a plurality of apertures 12, formed at proper intervals in each end of the grinding-rollers. It will also be observed that in order to more reliably sustain the grinding-rollers in their operative positions I provide each edge of the side walls 4 with a similar plurality of teeth 13, also designed to coöperate with the same apertures 12 in each end of the rollers, and it is therefore obvious that when the middle plate 10 is vertically reciprocated by means of the arms 14 through the mediation of the cross-bar 15 and the pump-rod 16 said rollers will be alternately raised and lowered. By thus alternately raising and lowering the grinding-rollers in the manner above described or by other equivalent means it will be obvious that wheat, corn, or other variety of grain introduced from above upon said rollers will be crushed and thoroughly pulverized by the action of the rollers upon the plates 4 or 10, as the case may be. It will be further apparent that when the plate 10 is forced downward the grain will be delivered by the rollers themselves against said plate, thereby insuring that the grain will be thoroughly crushed by the contact of the rollers with the middle plate, while upon an upward movement of the plate 10 the grain will be directed outward by the rollers and crushed between the rollers and the outer plates or side sections 4.

Any suitable form of receiving-hopper 17 may be provided and properly connected to the upper ends of the end and side walls 2 and 4, respectively, an auxiliary hopper 18 being connected to the hopper proper, as shown in Fig. 2. This auxiliary hopper, it will be observed, is so formed as to provide practically two separate hoppers, the delivery orifice whereof is upon either side of middle plate 10, the division of the hoppers being effected by means of the inclined partitions 19, which are provided upon each side with a suitable aperture, through which the arm 14 extends loosely downward into engagement with said plate.

It becomes desirable to regulate the degree of fineness to which the grain may be ground or crushed, and with this purpose in view some suitable clamping device is necessary, which result may be accomplished in a variety of ways. It will be observed that the crushing-rollers are entirely inclosed in a casing or husk, as set forth, and it of course becomes desirable that any suitable spout or delivery-orifice may be provided at the bottom, through which the product may be gathered from time to time or the product may fall directly into any suitable receptacle placed to receive it. The adjustment of the degree of fineness of the product is easily effected by turning the lock-nuts 6 upon the stay or clamping bolts 5, thus enabling the operator to easily vary the proximity of the rollers to the plates with which they are coöperating.

It will be observed by reference to Figs. 1 and 2 that the clamping-bars 7 are not disposed directly in contact with the side sections 4, but engage the spring-plates 20, which are held a short distance away from said side sections by means of the angle-irons 21, and this disposition of the spring-plate 20 in engagement with the clamping-bar 7 insures that the said side plates or sections 4 are left free to yieldingly move outward to compensate for any foreign substance which may be in the grain, as a nail, stone, piece of cob, or the like.

Upon reference to Fig. 2 it will be seen that by the spring-relief afforded by the plates 20 and the angle-irons 21, the uppermost ones of which are secured to the lower portion of the hopper 17, the sides 4 are yieldingly mounted and still held against undue outward movement and at the same time brought back to their normal position by the spring of the said plate as soon as the obstruction is passed.

I desire also to call attention to the fact that each of the hoppers is provided with longitudinally-disposed discharging-orifices, through which the grain is fed to the rollers, and to the bottom of each hopper I provide the depending trough-like distributer 22, properly secured in position and open upon each edge, as clearly shown in Fig. 2. The grain, therefore, will drop downward into this trough-like receptacle and is thence discharged by the oscillating grain-distributing bar or blade 23, which is properly connected to the rock-shaft 24 by means of the arms 25, it being understood that said rock-shaft 24 is of sufficient length to extend from end to end of the trough-like receptacle 22 and the end thereof is connected to the operating-crank 26, as shown in dotted lines in Fig. 2, said crank being operated by the controlling-rod 27, which extends upward and is connected in any preferred way to the source of power.

Having thus fully described the construction and combination of parts deemed necessary in carrying out my invention, the operation thereof, it is thought, will be fully apparent, though it may be stated that the grain is fed to the rollers through the double hopper, as above described, and thence into the receptacle 22, and from thence discharged by the oscillating agitator or blade 23. The quantity of grain discharged is therefore gaged, a proper quantity being fed to the mill at each stroke and discharged against the middle plate during the downward stroke of the plate 10 and against the outer plates during the upward stroke of said middle plate, the grain being entirely held back when the mill is at rest, this being a very desirable and important feature.

The various parts of my invention may be very cheaply formed, while a great saving of power is the result of the use thereof, inasmuch as there is no journal friction, as all the power applied is utilized for the actual work of reducing the grain. It therefore follows that there is much saving of lubricating-oils as well as the avoidance of friction.

My improved mill possesses a great range of capacity, as one side may be run entirely empty in case the power is light, thereby making it possible to run one side of the mill empty without injury to the machine or impairing its efficiency. The grain, therefore, may be reduced to the desired degree of fineness and uniformity of condition with a minimum amount of power.

Having thus fully described my invention, what I claim as new, and desire to secure by Letters Patent, is—

1. The combination with the outer sections of the frame having a plurality of teeth upon their inner faces, of grinding-rollers having a plurality of apertures in their periphery and arranged in pairs; a reciprocatory plate interposed between said rollers and having teeth upon its opposite sides to engage in the apertures of the rollers; means for reciprocating said middle plate and spring-plates disposed outside of the outer sections and mounted to yield with said outer sections when any foreign substance is engaged by the rollers, as and for the purpose set forth.

2. The combination with the outer sections of the frame having a plurality of teeth upon their inner faces, of grinding-rollers having a plurality of apertures in their periphery and arranged in pairs; a reciprocatory plate interposed between said rollers having teeth upon its opposite sides to engage in the apertures of the rollers; means for reciprocating said middle plate and spring-plates disposed outside of the outer sections and mounted to yield with said outer sections when any foreign substance is engaged by the rollers; angle-irons interposed between said outer sections and spring-plates and clamping-bars engaging said spring-plates and alternating with the angle-irons as set forth.

In testimony whereof I affix my signature in presence of two witnesses.

HIRAM C. GROVES.

Witnesses:
G. L. DILLON,
JOHN E. D. V. SMITH.